United States Patent
Goodman

(10) Patent No.: US 8,659,747 B2
(45) Date of Patent: Feb. 25, 2014

(54) DETERMINING THRESHOLDS TO FILTER NOISE IN GMAPD LADAR DATA

(75) Inventor: Vernon R. Goodman, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 329 days.

(21) Appl. No.: 13/162,935

(22) Filed: Jun. 17, 2011

(65) Prior Publication Data

US 2012/0320363 A1    Dec. 20, 2012

(51) Int. Cl.
*G01C 3/08*    (2006.01)

(52) U.S. Cl.
USPC ............ 356/4.01; 356/3.01; 356/5.01; 356/9; 356/625

(58) Field of Classification Search
USPC ....................... 356/4.01, 5.01, 3.01
See application file for complete search history.

(56) References Cited

U.S. PATENT DOCUMENTS

| | | | |
|---|---|---|---|
| 7,279,893 B1 * | 10/2007 | Marinelli et al. | 324/307 |
| 7,304,645 B2 | 12/2007 | Blask et al. | |
| 8,125,620 B2 * | 2/2012 | Lewis | 356/5.01 |
| 8,150,120 B2 * | 4/2012 | Gindele et al. | 382/128 |
| 2009/0073440 A1 * | 3/2009 | Tiemeyer | 356/338 |
| 2010/0045674 A1 | 2/2010 | Clifton | |
| 2010/0217529 A1 * | 8/2010 | Stroila et al. | 702/5 |
| 2011/0169117 A1 * | 7/2011 | McIntosh et al. | 257/432 |
| 2013/0108148 A1 * | 5/2013 | Goodman et al. | 382/154 |

FOREIGN PATENT DOCUMENTS

WO    WO 2008004230 A2 *    1/2008
WO    WO2011064132       *    3/2011

OTHER PUBLICATIONS

Michael E. O'Brien et al., "Simulation of 3D Laser Radar Systems," Lincoln Laboratory Journal, vol. 16, No. 1, 2005, pp. 37-60.

* cited by examiner

*Primary Examiner* — Isam Alsomiri
*Assistant Examiner* — Samantha K Abraham
(74) *Attorney, Agent, or Firm* — Daly, Crowley, Mofford & Durkee, LLP

(57) ABSTRACT

In one aspect, a computerized method to automatically determine thresholds includes receiving data generated from a Geiger-mode avalanche photodiode (GmAPD) laser detecting and ranging (LADAR) sensor of a scene, determining an overall threshold value for the scene using a binomial distribution and determining post threshold values for each x-y position in the scene. The computerized method also includes, for each x-y position, using a maximum value of the post threshold values and the overall threshold value to filter the data from the scene.

19 Claims, 5 Drawing Sheets

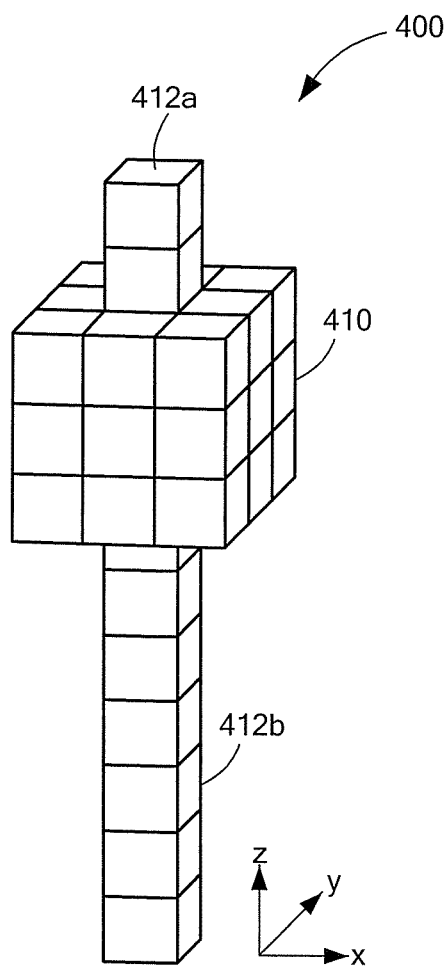
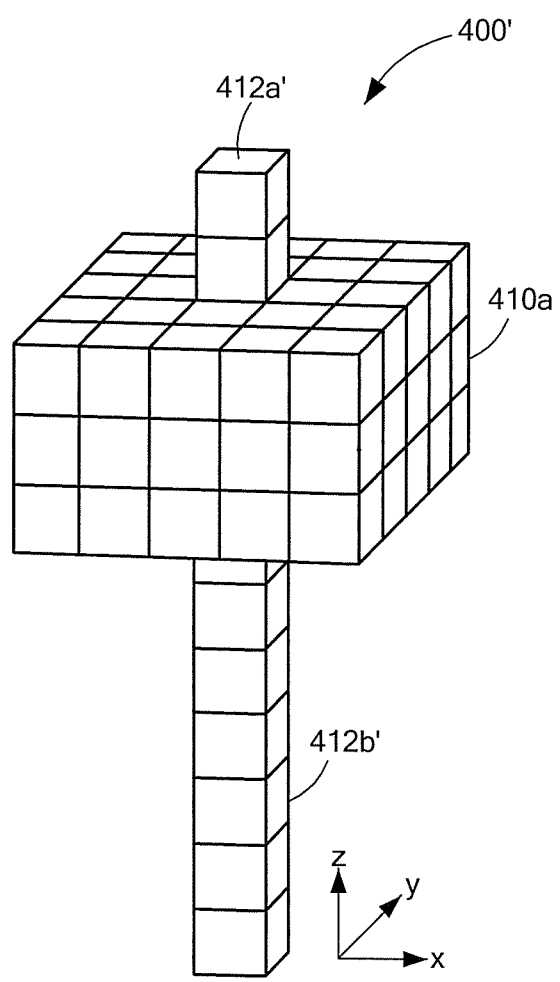
*FIG. 4A*  *FIG. 4B*

DETERMINING THRESHOLDS TO FILTER NOISE IN GMAPD LADAR DATA

GOVERNMENT SPONSORED RESEARCH

This invention was made with Government funds. The United States Government has certain rights in the invention.

BACKGROUND

A Laser Detection and Ranging (LADAR) sensor, sometimes referred to as laser radar, uses laser beams to measure distances. The LADAR sensor can be used to form images of scenes with a high degree of definition (e.g., 15 cm resolution at 1,000 meters). LADAR sensors are classified as a three-dimensional (3-D) sensor because the output of the data from these sensors includes 3-D data with, for example, x-, y-, and z-coordinates. Other 3-D sensors include a synthetic aperture radar (SAR) and stereo-optic imagery.

SUMMARY

In one aspect, a computerized method to automatically determine thresholds includes receiving data generated from a Geiger-mode avalanche photodiode (GmAPD) laser detecting and ranging (LADAR) sensor of a scene, determining an overall threshold value for the scene using a binomial distribution and determining post threshold values for each x-y position in the scene. The computerized method also includes, for each x-y position, using a maximum value of the post threshold values and the overall threshold value to filter the data from the scene.

In another aspect, an apparatus includes circuitry to determine thresholds including circuitry to receive data generated from a Geiger-mode avalanche photodiode (GmAPD) laser detecting and ranging (LADAR) sensor of a scene, determine an overall threshold value for the scene using a binomial distribution, determine post threshold values for each x-y position in the scene and, for each x-y position, use a maximum value of the post threshold values and the overall threshold value to filter the data from the scene.

In a further aspect, an article includes a non-transitory machine-readable medium that stores executable instructions to automatically detect buildings. The instructions cause a machine to receive data generated from a Geiger-mode avalanche photodiode (GmAPD) laser detecting and ranging (LADAR) sensor of a scene, determine an overall threshold value for the scene using a binomial distribution, determine post threshold values for each x-y position in the scene and, for each x-y position, use a maximum value of the post threshold values and the overall threshold value to filter the data from the scene.

DESCRIPTION OF THE DRAWINGS

FIGS. 4A and 4B are examples of a voxel configuration used in a convolution matrix.

DETAILED DESCRIPTION

Described herein are techniques for determining threshold levels (e.g., constant false alarm rate (CFAR) thresholds) for data received from laser detection and ranging radar (LADAR) sensors to filter out noise. In particular, threshold levels are automatically (e.g., without user intervention) determined for data generated from Geiger-mode avalanche photodiode (GmAPD) LADAR sensors. Prior art attempts determined threshold levels using a Poisson distribution for continuous waveforms generated from linear or coherent LADAR. As described herein, a binomial distribution is used to determine threshold values used to filter data generated from GmAPD LADAR sensors.

A GmAPD LADAR sensor records a time a first single photon is detected to determine distance. A scan from a GmAPD LADAR sensor captures a rectangle of points on the ground per pulse and illuminates the same point (x-y position) several times, possibly detecting multiple return points (different z positions) per x-y position (post). For example, if a scan passes through branches of a tree, the returns could capture the ground and different branch layers of the tree.

Stray light and sensor noise contribute to noise in the GmAPD LADAR data. One way to filter out the noise in the data is to use thresholds. For example, values below the threshold are assumed to be noise. In particular, data points having a value below a particular threshold are filtered out. As will be shown herein a threshold value is determined for an entire set of data for a scene called an overall threshold value. Thresholds values are also determined for each x-y position (post) called post threshold values. For each x-y position, the maximum value of the overall threshold value and the post threshold values are used.

Figure 1:
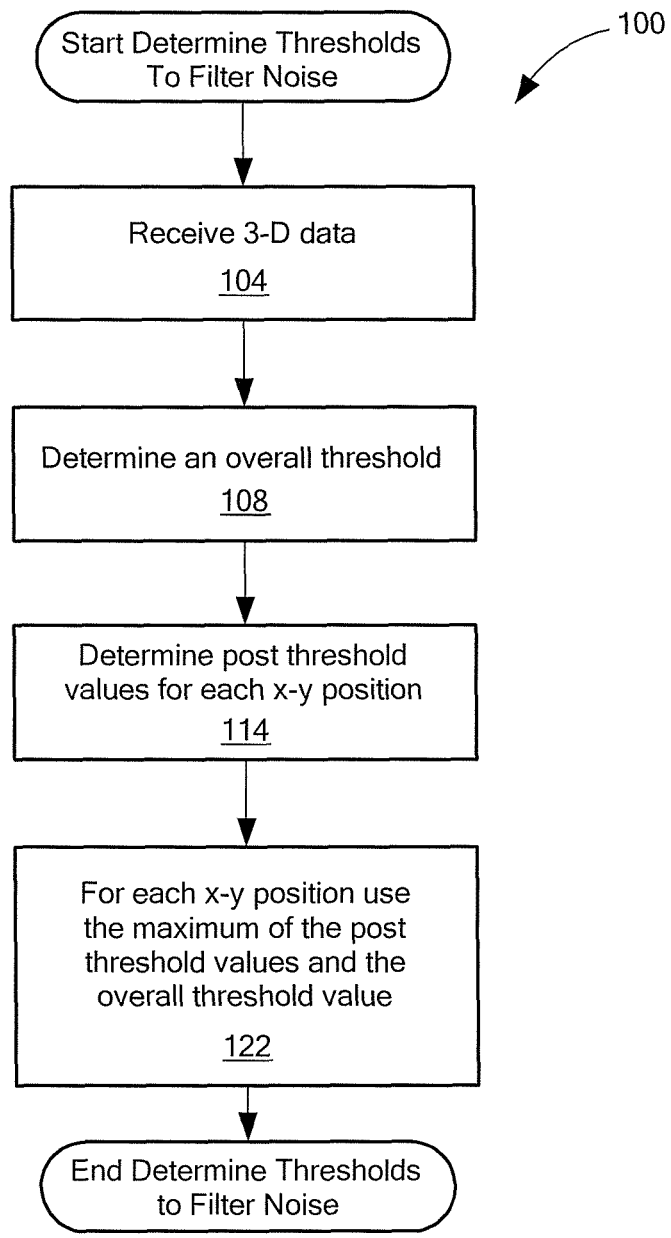
FIG. 1 is a flowchart of an example of a process to determine thresholds to filter noise.

Referring to FIG. 1, one example of a process to determine threshold values is a process 100. Process 100 receives 3-D data collected by a GmAPD LADAR sensor (104). Process 100 determines an overall threshold value (108) and post threshold values for each x-y position (114). For each x-y position, process 100 uses the maximum value of the post threshold values and the overall threshold value to filter out the 3-D data (122).

Figure 2:
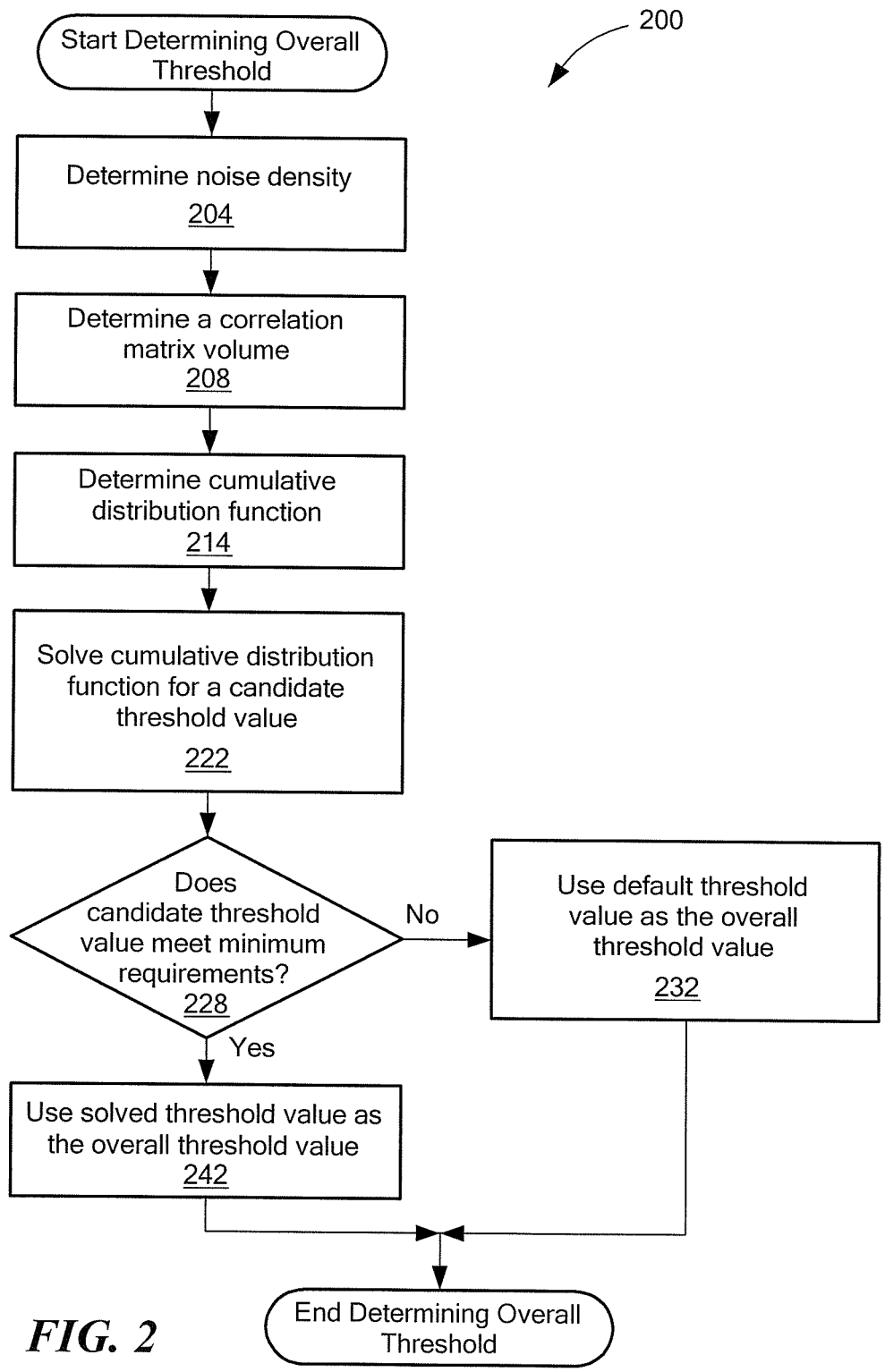
FIG. 2 is a flowchart of an example of a process to determine an overall threshold.

Referring to FIG. 2, one example of a process to determine an overall threshold value in processing block 108 is a process 200. Process 200 determines a noise density (204). For example, the noise density may be measured. In other examples, the noise density is determined from system parameters (e.g., stray light rate, crosstalk rate, dark count rate and so forth). In one example, a unit of noise density is average noise per cubic meter.

Process 200 determines a correlation matrix volume, v (208). In one example, v is a value that is measured in cubic meters and is calculated from the voxel dimensions and the number of voxels in a convolution matrix. A convolution matrix volume includes an arrangement of voxels with one voxel designated as point of interest usually in the center of the volume (see FIGS. 4A and 4B for an example of convolution matrix volumes).

Process 200 determines a cumulative distribution function (214). For example, a cumulative distribution function is:

$$F(x; n, p) = Pr(X > x) = 1 - \sum_{i=0}^{\lfloor x \rfloor} \binom{n}{i} p^i (1-p)^{n-i} = C,$$

where n and p are parameters of a binomial distribution. p is the probability of a point falling in a correlation matrix volume based on the noise density determined in processing block 204. n represents a number of trials, which is the total number of voxels in the scene volume. The function, F(x; n, p)

is an approximation that x points fall into any correlation matrix volume in the total volume.

Process 200 solves the cumulative distribution function for a candidate threshold, x (222). For example, $\Pr(X>x)$ is set equal to some value, C. For example, $\Pr(X>x)$ is set equal to 1 millionth ($1\times10^{-6}$), which means that the algorithm has a probability of accepting a noise point as a real point of one in a million. This is known as the probability of a false alarm. The noise density is determined in block 204 by counting the number of noise points in a given volume that is known to not have any real returns. That is, the volume is known to contain only noise.

Process 200 determines if the candidate threshold value, x, meets minimum requirements (228) and if the candidate threshold value, x, does not meet the minimum requirements, process 200 uses a default value for the overall threshold value (332). For example, if n is too large compared to the correlation matrix volume (e.g., if n is greater than about 10% of the number of voxels) then, the overall threshold is set equal to $2*v*(R/S)$, where v is the correlation matrix volume determined in processing block 208, R is equal to the average number of reflection received at the LADAR for each x-y position and S is the average number of times the LADAR shines on each x-y position. In another example, if $x<R*2.5$ then the overall threshold is set equal to $R*2.5$. In a further example, if $x<S*10.0$ then the overall threshold is set equal to $S*10.0$. If the candidate threshold value, x, meets the minimum requirements then the candidate value is used as the overall threshold value (242).

Figure 3:
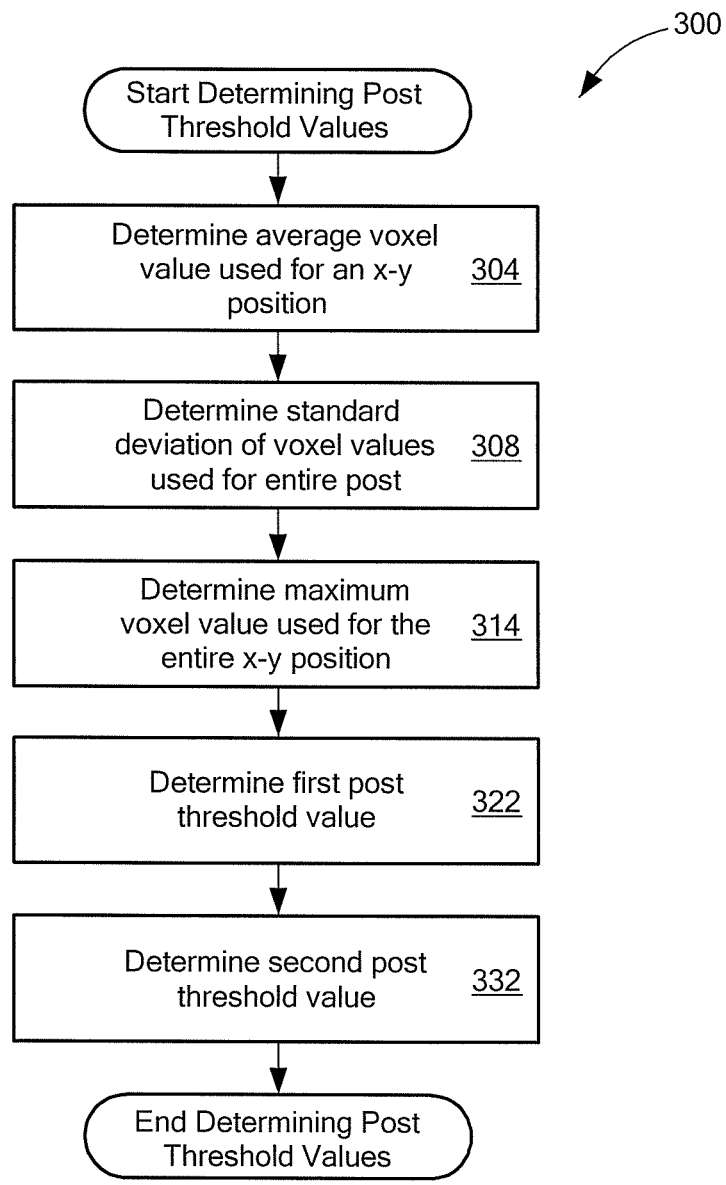
FIG. 3 is a flowchart of an example of a process to determine post thresholds.

Referring to FIG. 3, one example of a process to determine post threshold values is a process 300. Process 300 uses the convolution matrix volume used in process 200. The point of interest corresponds to the x-y position for which the post threshold values are being determined. The value of the returns for each of the voxels are determined and used in process 300.

Process 300 determines an average voxel value, $p_{avg}$, used for an x-y position (post) (304), determines a standard deviation of voxel values, $p_{std}$, used for entire x-y position (post) (308) and determines the maximum voxel value, $p_{max}$, used for entire x-y position (post) (314).

Process 300 determines a first post threshold value (322). In one example, the first threshold value is equal to a minimum value of $p_{avg}$, $p_{std}$, and $p_{max}$.

Process 300 determines a second post threshold value (332). In one example, the second threshold value is equal to:

$$(f/10)*(p_{max}-p_{avg})+p_{avg},$$

where f is equal to a sigma multiplier based on a desired output product type. For example, output product types may include high resolution mapping, low resolution mapping, and foliage penetration.

Referring back to FIG. 1, with respect to processing block 122, a maximum of the first post threshold value for an x-y position, the second post threshold value of the x-y position and the overall threshold is used for filtering at the x-y position.

Referring to FIG. 4A, one example of a convolution matrix used in processes 200 and 300 is a convolution matrix 400. The convolution matrix 400 includes three portions: a first portion 410 includes a 3×3×3 voxel dimensions, a second portion 412a includes a 1×1×2 voxel dimensions and a third portion 412b includes a 1×1×7 voxel dimensions. A center voxel (not shown) of the first portion 410 of the 3×3×3 voxels represents a point of interest.

Referring to FIG. 4B, another example of a convolution matrix used in process 300 is a convolution matrix 400'. The convolution matrix 400' includes three portions: a first portion 410' includes a 5×5×3 voxel dimensions and a second portion 412a' includes a 1×1×2 voxel dimensions and a third portion 412b' includes a 1×1×7 voxel dimensions. These two linear portions may be of any length and are dependent upon the time uncertainty response of the sensor. A center voxel (not shown) of the first portion 410' represents a point of interest. Convolution matrix volume 400' is larger than the convolution matrix 400 and is used in areas, for example, that are less reflective (e.g., roads, asphalt, roofs, swamps and other less reflective areas) than areas suited for the convolution matrix 400. For example, dimensions of a single voxel are about 0.3 meters×0.3 meters×0.15 meters but may be adjusted by the user.

Figure 5:
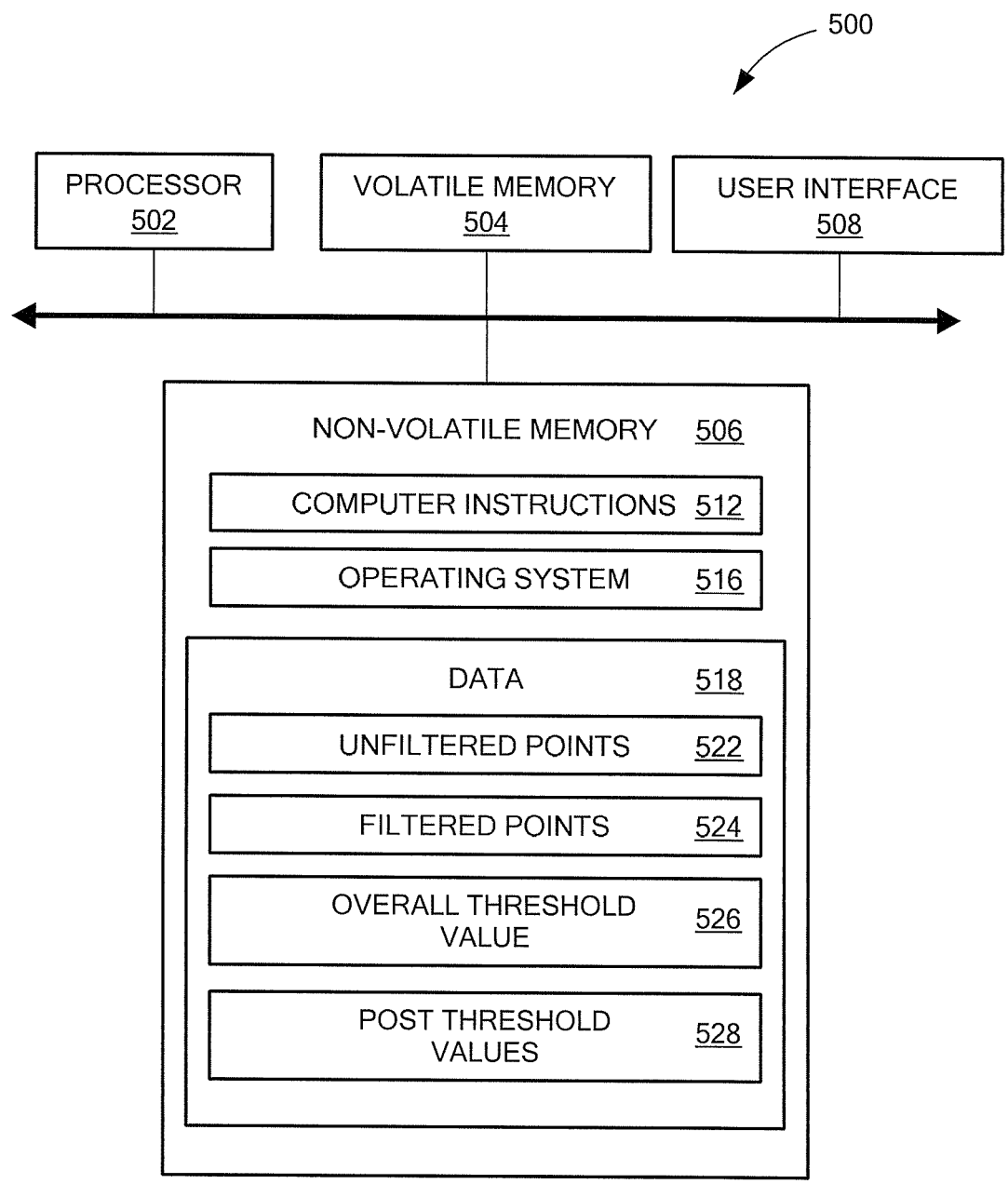
FIG. 5 is a computer on which any of the processes of FIGS. 1 to 3 may be implemented.

Referring to FIG. 5, a computer 500 may be used to execute all or part of the processes described herein (e.g., the processes 100, 200, 300). The computer 500 includes a processor 502, a volatile memory 504, a non-volatile memory 506 (e.g., hard disk), for example, and a user interface (UI) 508 (e.g., a mouse, a keyboard, a touch screen and so forth). In other examples of a computer 500, the UI 508 may not be included. Non-volatile memory 506 includes an operating system 516; data 518; and computer instructions 512 which are executed out of volatile memory 504 to perform all or part of processes 100, 200, 300. In one example, the data 518 may include unfiltered points 522 (e.g., received from a 3-D sensor), filtered points 524 (e.g., as an output of a process 100), overall threshold value 526 (e.g., as an output of a process 200) and post threshold values 528 (e.g., as an output of a process 300).

The processes described herein (e.g., processes 100, 200, 300) are not limited to use with the hardware and software of FIG. 5; they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any or part of the processes 100, 200, 300, for example, and to generate output information.

The processes described herein are not limited to the specific embodiments described herein. For example, the processes are not limited to the specific processing order of the process steps in FIGS. 1 to 3. Rather, any of the processing steps of FIGS. 1 to 3 may be re-ordered, combined or removed, performed in parallel or in serial, as necessary, to achieve the results set forth above.

Process steps in FIGS. 1 to 3 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

While the invention is shown and described in conjunction with a particular embodiment having an illustrative architecture having certain components in a given order, it is understood that other embodiments well within the scope of the invention are contemplated having more and fewer components, having different types of components, and being coupled in various arrangements. Such embodiments will be readily apparent to one of ordinary skill in the art. All documents cited herein are incorporated herein by reference. Other embodiments not specifically described herein are also within the scope of the following claims.

What is claimed is:

1. A computerized method to automatically determine thresholds, comprising:
   receiving data generated from a Geiger-mode avalanche photodiode (GmAPD) laser detecting and ranging (LADAR) sensor of a scene;
   determining an overall threshold value for the scene using a binomial distribution;
   determining post threshold values for each x-y position in the scene; and
   for each x-y position, using a maximum value of the post threshold values and the overall threshold value to filter the data from the scene,
   wherein determining the overall threshold value comprises:
   determining a noise density;
   determining a volume of a correlation matrix, v;
   solving a cumulative distribution function for a candidate threshold value;
   using the candidate threshold value as the overall threshold value if the candidate threshold value meets minimum requirements; and
   using a default value as the overall threshold value if the candidate threshold value does not meet the minimum requirements.

2. The method of claim 1 wherein
the cumulative distribution function is:

$$1 - \sum_{i=0}^{|x|} \binom{n}{i} p^i (1-p)^{n-i} = C,$$

where n is a number of trials, p is the probability of a point falling in the correlation matrix volume based on the noise density, x is the candidate threshold and C is a constant.

3. The method of claim 2 wherein using a default value as the overall threshold value comprises:
   using a default value equal to $2*v*(R/S)$ if n is greater than about 10% of the number of voxels in the volume;
   using a default value equal to $R*2.5$ if the candidate threshold value is less than $R*2.5$; and
   using a default value equal to $S*10.0$ if the candidate threshold value is less than $S*10.0$,
   wherein R is equal to the average number of reflection received at the LADAR for each x-y position, S is the average number of times the LADAR shines on each x-y position and v is equal to the volume of the correlation matrix.

4. The method of claim 2 wherein $C=1\times10^{-6}$.

5. A computerized method to automatically determine thresholds, comprising:
   receiving data generated from a Geiger-mode avalanche photodiode (GmAPD) laser detecting and ranging (LADAR) sensor of a scene;
   determining an overall threshold value for the scene using a binomial distribution;
   determining post threshold values for each x-y position in the scene; and
   for each x-y position, using a maximum value of the post threshold values and the overall threshold value to filter the data from the scene,
   wherein determining post threshold values for each x-y position in the scene comprises determining a first post threshold value equal to a minimum value of $p_{avg}$, $p_{std}$, and $p_{max}$ where $p_{avg}$ is an average voxel value used for an x-y position, $P_{std}$ is a standard deviation of voxel values used for the x-y position and $p_{max}$ is the maximum voxel value used for the x-y position.

6. The method of claim 5 wherein determining post threshold values for each x-y position in the scene comprises determining a second post threshold value equal to $(f/10)*(p_{max}-p_{avg})+p_{avg}$ where f is a sigma multiplier.

7. An apparatus comprising:
   circuitry to determine thresholds comprising circuitry to:
   receive data generated from a Geiger-mode avalanche photodiode (GmAPD) laser detecting and ranging (LADAR) sensor of a scene;
   determine an overall threshold value for the scene using a binomial distribution;
   determine post threshold values for each x-y position in the scene; and
   for each x-y position, use a maximum value of the post threshold values and the overall threshold value to filter the data from the scene,
   wherein the circuitry to use a default value as the overall threshold value comprises circuitry to:
   determine a noise density;
   determine a volume of a correlation matrix, v;
   solve a cumulative distribution function for a candidate threshold value;
   use the candidate threshold value as the overall threshold value if the candidate threshold value meets minimum requirements; and
   use a default value as the overall threshold value if the candidate threshold value does not meet the minimum requirements.

8. The apparatus of claim 7 wherein the circuitry comprises at least one of a processor, a memory, programmable logic and logic gates.

9. The apparatus of claim 7 wherein
the cumulative distribution function is:

$$1 - \sum_{i=0}^{|x|} \binom{n}{i} p^i (1-p)^{n-i} = C,$$

where n is a number of trials, p is the probability of a point falling in the correlation matrix volume based on the noise density, x is the candidate threshold and C is a constant.

10. The apparatus of claim 9 wherein the circuitry to use a default value as the overall threshold value comprises circuitry to:
    use a default value equal to $2*v*(R/S)$ if n is greater than about 10% of the number of voxels in the volume;
    use a default value equal to $R*2.5$ if the candidate threshold value is less than $R*2.5$; and
    use a default value equal to $S*10.0$ if the candidate threshold value is less than $S*10.0$,
    wherein R is equal to the average number of reflection received at the LADAR for each x-y position, S is the average number of times the LADAR shines on each x-y position and v is equal to the volume of the correlation matrix.

11. The apparatus of claim 9 wherein $C=1\times10^{-6}$.

12. An apparatus comprising:
   circuitry to determine thresholds comprising circuitry to:
   receive data generated from a Geiger-mode avalanche photodiode (GmAPD) laser detecting and ranging (LADAR) sensor of a scene;
   determine an overall threshold value for the scene using a binomial distribution;
   determine post threshold values for each x-y position in the scene; and
   for each x-y position, use a maximum value of the post threshold values and the overall threshold value to filter the data from the scene,
   wherein the circuitry to determine post threshold values for each x-y position in the scene comprises circuitry to determine a first post threshold value equal to a minimum value of $p_{avg}$, $p_{std}$, and $p_{max}$ where $P_{avg}$ is an average voxel value used for an x-y position, $p_{std}$ is a standard deviation of voxel values used for the x-y position and $p_{max}$ is the maximum voxel value used for the x-y position.

13. The apparatus of claim 12 wherein the circuitry to determine post threshold values for each x-y position in the scene comprises circuitry to determine a second post threshold value equal to $(f/10)*(p_{max}-p_{avg})+p_{avg}$ where f is a sigma multiplier.

14. An article comprising:
   a non-transitory machine-readable medium that stores executable instructions to automatically detect buildings, the instructions causing a machine to:
   receive data generated from a Geiger-mode avalanche photodiode (GmAPD) laser detecting and ranging (LADAR) sensor of a scene;
   determine an overall threshold value for the scene using a binomial distribution;
   determine post threshold values for each x-y position in the scene; and
   for each x-y position, use a maximum value of the post threshold values and the overall threshold value to filter the data from the scene.

15. The article of claim 14 wherein the instructions causing a machine to determine the overall threshold value comprises instructions causing a machine to:
   determine a noise density;
   determine a volume of a correlation matrix, v;
   solve a cumulative distribution function for a candidate threshold value, x, the cumulative distribution function is:

$$1 - \sum_{i=0}^{|x|} \binom{n}{i} p^i (1-p)^{n-i} = C,$$

where n is a number of trials, p is the probability of a point falling in the correlation matrix volume based on the noise density and C is a constant;
   use the candidate threshold value as the overall threshold value if the candidate threshold value meets minimum requirements; and
   use a default value as the overall threshold value if the candidate threshold value does not meet the minimum requirements.

16. The article of claim 15 wherein the instructions causing a machine to use a default value as the overall threshold value comprises instructions causing a machine to:
   use a default value equal to $2*v*(R/S)$ if n is greater than about 10% of the number of voxels in the volume.
   use a default value equal to $R*2.5$ if the candidate threshold value is less than $R*2.5$; and
   use a default value equal to $S*10.0$ if the candidate threshold value is less than $S*10.0$,
   wherein R is equal to the average number of reflection received at the LADAR for each x-y position, S is the average number of times the LADAR shines on each x-y position and v is equal to the volume of the correlation matrix.

17. The article of claim 15 wherein $C=1\times10^{-6}$.

18. The article of claim 14 wherein the instructions causing a machine to determine post threshold values for each x-y position in the scene comprises instructions causing a machine to determine a first post threshold value equal to a minimum value of $p_{avg}$, $p_{std}$, and $p_{max}$ where $p_{avg}$ is an average voxel value used for an x-y position, $p_{std}$ is a standard deviation of voxel values used for the x-y position and $p_{max}$ is the maximum voxel value used for the x-y position.

19. The article of claim 18 wherein the instructions causing a machine to determine post threshold values for each x-y position in the scene comprises instructions causing a machine to determine a second post threshold value equal to $(f/10)*(p_{max}-p_{avg})+p_{avg}$ where f is a sigma multiplier.

* * * * *